US008407155B2

(12) United States Patent
Greco

(10) Patent No.: US 8,407,155 B2
(45) Date of Patent: Mar. 26, 2013

(54) ON-LINE MAIL PROCESSING SYSTEM AND MOBILE DEVICE APPLICATION THEREFOR

(75) Inventor: Jesse G. Greco, Naugatuck, CT (US)

(73) Assignee: Pitney Bowes Inc., Stamford, CT (US)

( * ) Notice: Subject to any disclaimer, the term of this patent is extended or adjusted under 35 U.S.C. 154(b) by 382 days.

(21) Appl. No.: 12/636,003

(22) Filed: Dec. 11, 2009

(65) Prior Publication Data

US 2011/0145107 A1 Jun. 16, 2011

(51) Int. Cl.
*G06F 17/00* (2006.01)
(52) U.S. Cl. .......................... 705/400; 705/410; 705/335
(58) Field of Classification Search .................... 705/1.1, 705/330–400, 410, 409, 416, 26.1–34, 7.35; 709/217–219; 707/E17.02, E17.022, E17.023; 455/517, 507, 414.1–414.3
See application file for complete search history.

(56) References Cited

U.S. PATENT DOCUMENTS

| | | | | |
|---|---|---|---|---|
| 6,947,976 | B1 * | 9/2005 | Devitt et al. | 709/219 |
| 7,035,856 | B1 * | 4/2006 | Morimoto | 705/7.12 |
| 7,075,451 | B2 * | 7/2006 | Yamada | 705/5 |
| 7,653,553 | B2 * | 1/2010 | Das et al. | 705/1.1 |
| 7,689,519 | B2 * | 3/2010 | Chatte | 705/401 |
| 7,818,267 | B1 * | 10/2010 | Bilibin et al. | 705/335 |
| 7,883,013 | B2 * | 2/2011 | Skaaksrud et al. | 235/384 |
| 8,060,389 | B2 * | 11/2011 | Johnson | 705/6 |
| 8,165,916 | B2 * | 4/2012 | Hoffberg et al. | 705/14.53 |
| 2003/0004912 | A1 * | 1/2003 | Pant et al. | 706/47 |
| 2003/0212644 | A1 * | 11/2003 | McLintock | 705/402 |
| 2004/0003256 | A1 * | 1/2004 | Coffy et al. | 713/179 |
| 2004/0162076 | A1 * | 8/2004 | Chowdry et al. | 455/445 |
| 2006/0282271 | A1 * | 12/2006 | Ananda et al. | 705/1 |
| 2008/0133050 | A1 * | 6/2008 | Haug | 700/227 |
| 2008/0209010 | A1 | 8/2008 | Zitnick, III et al. | |
| 2009/0039167 | A1 * | 2/2009 | Wang et al. | 235/462.42 |
| 2010/0057593 | A1 * | 3/2010 | Moir et al. | 705/29 |
| 2010/0211441 | A1 * | 8/2010 | Sprigg et al. | 705/14.1 |
| 2010/0274569 | A1 * | 10/2010 | Reudink | 705/1.1 |
| 2011/0246384 | A1 * | 10/2011 | Williams et al. | 705/335 |
| 2011/0276429 | A1 * | 11/2011 | Davis et al. | 705/26.7 |
| 2011/0320317 | A1 * | 12/2011 | Yuan et al. | 705/26.61 |

FOREIGN PATENT DOCUMENTS

WO   WO 2005/114476 A1   1/2005

* cited by examiner

*Primary Examiner* — Igor Borissov
(74) *Attorney, Agent, or Firm* — Steven J. Shapiro; Charles R. Malandra, Jr

(57) ABSTRACT

A method for determining the postage associated with the delivery of an article including the steps of receiving an acquired image of the article over a network from a web enabled device (ii) comparing the acquired digital imaged to a plurality of stored digital images to ermine the identity of the acquired digital image, (iii) determining at least one characteristic of the identified digital image useful to determine a delivery cost associated with the identified digital image of the identified article, (iv) calculating the estimated cost of delivering the identified article to a destination address, and, (v) transmitting the estimated cost to the web enabled device. The method also determines the postage associated with the delivery of an article by means of a wireless communication network using a wireless mobile device having an optical imaging device. Furthermore, a system also determines the postage associated with the identified article.

20 Claims, 4 Drawing Sheets

ON-LINE MAIL PROCESSING SYSTEM AND MOBILE DEVICE APPLICATION THEREFOR

FIELD OF THE INVENTION

The present invention relates to mail processing systems, and more particularly, to an on-line mail processing system which employs a mobile device and a software application for determining the cost of, producing shipping/postage labels for, and, providing shipping information related to, mail delivery services.

BACKGROUND OF THE INVENTION

Mobile devices such as the Apple iPhone® (iPhone is a registered trademark of the Apple Computer Company, located in Cupertina, state of California, USA or Blackberry® mobile device (Blackberry is a registered trademark of Research In Motion (RIM), located in Waterloo, Ontario, Canada), are becoming increasingly popular to perform conventional tasks while in a mobile environment. That is, these devices are being used to perform routine tasks such as accessing information, obtaining travel directions, or purchasing products and/or services remotely via an on-line or "cloud" network. These devices are loaded with dedicated application software such that the operator may select one from a variety of competing software applications to perform the specific task. Currently, on an iPhone mobile device, an operator may chose from any one of nearly ten-thousand mobile applications to perform an equal number of every-day tasks.

One such task, to which the present invention is directed, relates to mailing and/or shipping a particular parcel and/or article to a specific destination address. This task requires that the sender of an article/parcel identify the item to be shipped/delivered, determine the requisite shipping information, e.g., the weight, size or volume of the item, estimate the cost of shipping/delivery based upon the shipping information, identify the nearest or most convenient shipping location, i.e., the location for receipt of the item to be shipped/delivered, the selection of any special or value added services (e.g., the class of mail delivery, return receipt, date of delivery, etc.), and payment for the delivery services to be rendered. Conventionally, these tasks are occur at the location where the item is inducted for shipping/delivery, i.e., at a postal facility, however, more recently, some of these tasks may be performed in advance, i.e., before arriving at, or induction into, the mail distribution system. That is, on-line systems, i.e., systems residing on the Internet, are currently available to aid and/or simplify certain of these tasks, such as obtaining shipping information and/or an adhesive-backed shipping label for application to the item to be shipped/delivered.

While these on-line systems offer the ability to expedite mail delivery, the sender is still tasked with obtaining the requisite shipping information, e.g., the weight, size and/or volume of the item, to obtain an accurate/true representation of the item to be delivered/shipped. Currently, no systems are integrated with the current mail distribution systems to reliably, accurately and expeditiously combine shipping information with the cost of shipping/delivery to obtain the actual shipping/delivery cost of the item. Accordingly, no label, postage indicia, or other proof of payment, can be produced to enable shipping/delivery of the item within the construct of current mail distribution systems.

A need, therefore, exists for an on-line system which integrates shipping information with current delivery cost information to expedite the processing and delivery of an item to be shipped/delivered.

SUMMARY OF THE INVENTION

A method is provided for determining the postage associated with the delivery of an article including the steps of receiving an acquired image of the article over a network from a web enabled device (ii) comparing the acquired digital imaged to a plurality of stored digital images to ermine the identity of the acquired digital image, (iii) determining at least one characteristic of the identified digital image useful to determine a delivery cost associated with the identified digital image of the identified article, (iv) calculating the estimated cost of delivering the identified article to a destination address, and, (v) transmitting the estimated cost to the web enabled device. A method is also provided for determining the postage associated with the delivery of an article by means of a wireless communication network using a wireless mobile device having an optical imaging device. Furthermore, a system is also described to determine the postage associated with the identified article.

BRIEF DESCRIPTION OF THE DRAWINGS

Further details of the present invention are provided in the accompanying drawings, detailed description, and claims.

DETAILED DESCRIPTION

Figure 1:
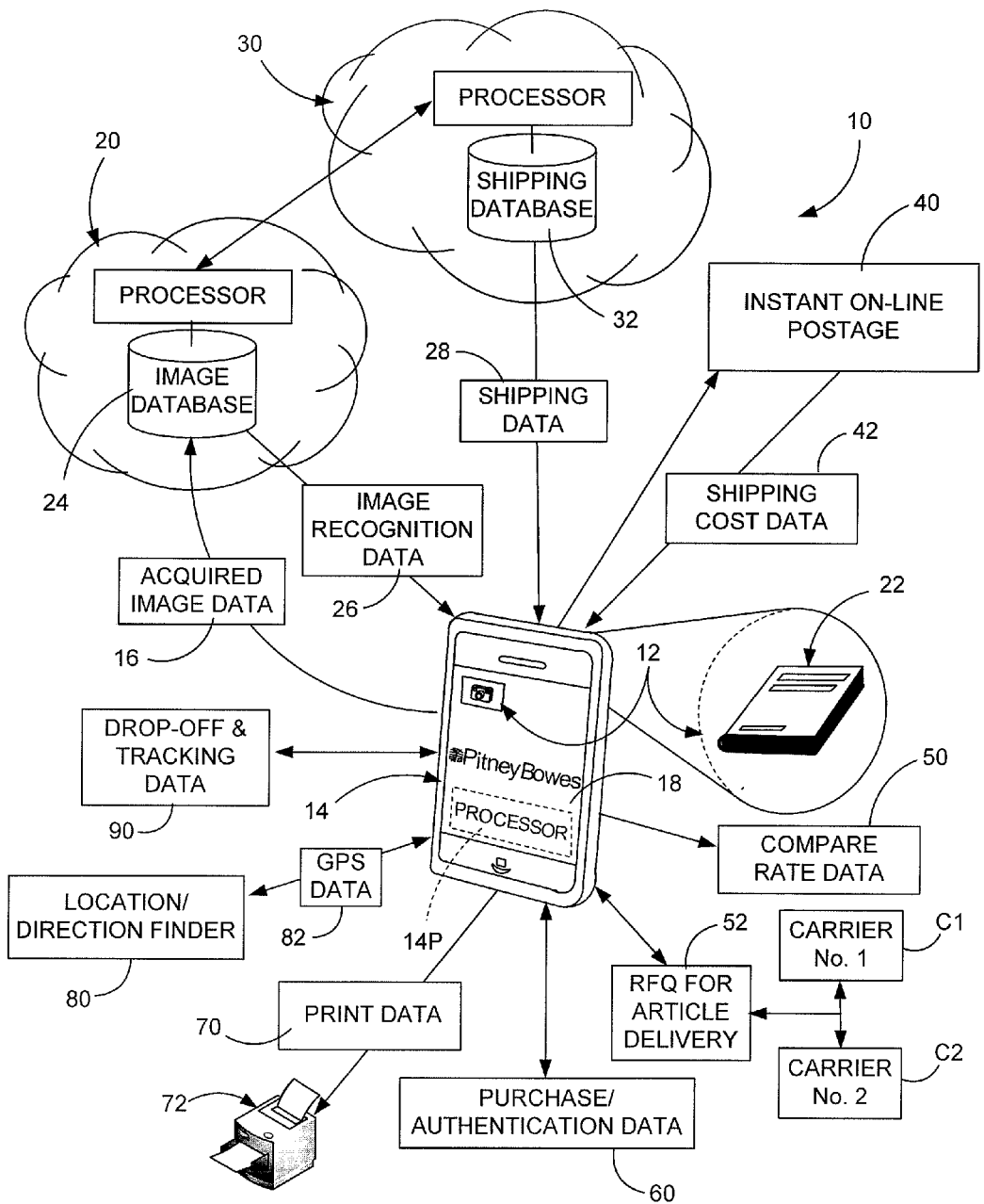
FIG. 1 is a schematic diagram of the on-line mail processing system according to the present invention including an image recognition system disposed in combination with a web-enabled/wireless mobile device to provide shipping data for delivery of an article.
Figure 2:
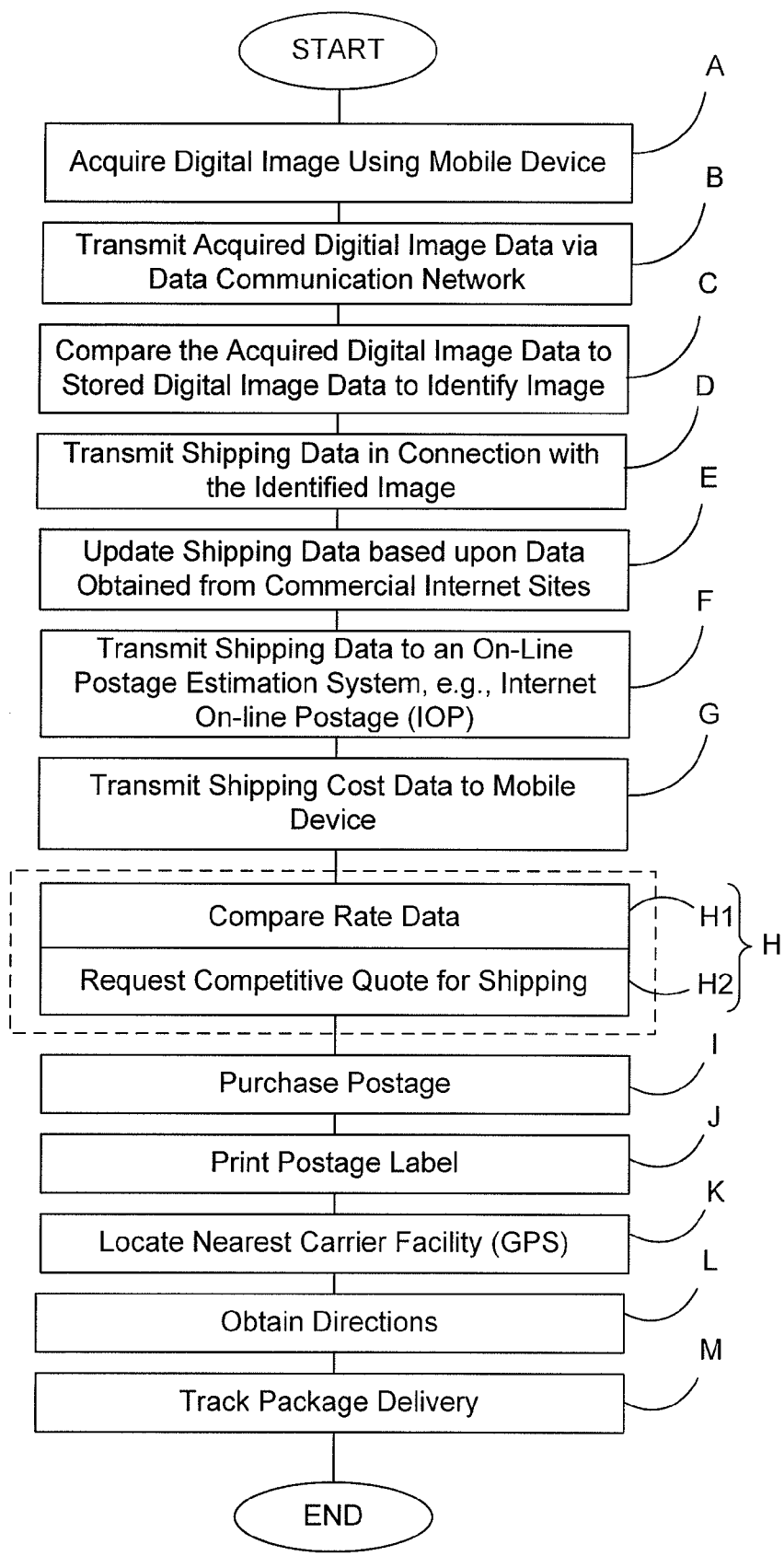
FIG. 2 is a flow diagram of the method steps for practicing the teachings of the present invention.

An on-line mail processing system is described for providing mail delivery services. In FIGS. 1 and 2, the on-line mail processing system 10 employs an image system 12, e.g., a camera, which is integrated with a wireless mobile device 14. While the invention is described in the context of a mobile device such as an iPhone fabricated and sold by the Apple Computer Corporation, it should be appreciated that the on-line mail processing system of the present invention may employ any Internet enabled-device, e.g., laptop computer, a desktop computer, a netbook, pocket PC, PDA, or wireless mobile device capable of communication over, or through a network/web service. The implementation of the on-line processing system operates in combination with any available Internet connection such as a wired communication network or a wireless network, e.g., 3G, 4G, EDGE, CDMA, WiMAX, etc. While the iPhone is a mobile device useful for practicing the teachings of the present invention, it should be appreciated that the IPhone is merely indicative of an exemplary embodiment of the invention, and should not be construed as limiting the scope of the appended claims.

In a first step A of the method (FIG. 2), digital image data 16 of an article for delivery is acquired by the imaging system 12. While the digital image 16 may be a previously acquired image, e.g., a stored digital image file, in the described embodiment, the imaging system 12 includes a conventional digital camera, i.e., an optical imaging system, for instantaneously acquiring digital image data of the article. That is, the imaging system 12 includes a digital camera residing in the mobile device 14 which is controlled by the touch-screen display 18 thereof. Once the digital image data 16 has been acquired, in step B, the digital image data 16 is transmitted over a network to an image recognition system 20 including an image database 22 having a plurality of stored digital images. To facilitate data transfer, a wireless communication network is preferred, although, as mentioned previously, transmission may be effected by a wired/direct data transfer connection.

In a next step C, the image recognition system 20 identifies the article 22 being imaged by comparing the acquired digital image data 16 to the stored digital image data, i.e., stored in the image database 24 or acquired via web searching software, to determine the identity of the acquired digital image. Various image recognition software is currently available on the Internet which may be useful for this purpose. Google XING® and Snaptel® are two such image recognition systems currently available on-line or via Web Service Providers. These image recognition systems include algorithms which access a vast amount of digital data, whether stored or accessed, such that the pixels of one image, whether in whole or in part, may be compared to those of other images. While the algorithms for identifying the image are not disclosed herein, it will be understood that these image recognition systems incorporate technologies which are known to those skilled in the applicable art. Accordingly, no further description is warranted/required herein to teach the essential features of the present invention.

Once the article 22 has been identified by the image recognition system 20, image recognition data 26 is returned to the mobile device 16 so that an operator can confirm that the image has been properly identified. That is, the image recognition system 20 may transmit a request to the mobile device 14, i.e., as part of the image recognition data 26, that the operator provide confirmation that the image identified corresponds to the image acquired.

If the image recognition system 20 has affirmatively identified the image, then in Step D, shipping data 28 useful for determining the delivery cost, i.e., hereinafter referred to as "shipping data", is attached/combined, or otherwise associated, with the image recognition data 26 and transmitted to the mobile device 14. That is, a shipping information system 30 including a shipping database 32 may be relationally connected to the image database 24 and populated with at least one shipping/delivery characteristic such as the article weight, dimensions, and/or volume. Other types of shipping data 28 such as the HS code, special handling requirements, such as may be required for handling controlled/hazardous materials, may also be linked to the items in the shipping database 32.

While the shipping information system 30 provides at least one shipping characteristic, useful in determining the cost of delivery, the mobile device 14 shall provide the operator with the ability to capture and enter shipping information. That is, the mobile device 14 allows the operator to enter the package weight, size, originating zip code and destination zip code.

In an alternate embodiment of the invention, the image recognition system 20 may use optical character recognition data obtained from the digital image data 16 to identify additional shipping data 28. For example, if the size or weight of an article can be read directly from a label contained thereon or within the frame of the digital image data 16, this data may be returned to the mobile device 14 as one of, or in addition to, the shipping characteristics.

In a step E, the shipping database 32 may be updated on a continuous or regular basis as articles are imaged or purchased/shipped on various on-line Internet and auction sites (e.g., Ebay). Inasmuch as many of these sites contain stored digital images of articles available for purchase, contain dimensional rating information, and may contain an average of the most recent delivery costs, these sites may be employed to rapidly populate and relate image data with shipping data on the image and shipping databases, respectively. Alternatively, a third party may be employed to provide data mining/collection services to populate the database 32.

In Step F, the shipping data 28 is transmitted to an on-line postage estimation system 40 such as the Instant On-Line Postage (IOP) system provided by Pitney Bowes Inc., located in Stamford, State of Connecticut, U.S. to estimate shipping costs. Other systems such as those provided by the United States Postal Service (USPS), DHL, and FedEx are also available for providing shipping estimates. To provide an estimate of the delivery/shipping cost, an operator may be required to input the anticipated induction address, i.e., the zip code associated with induction of the article into the mail delivery system, and the destination address, i.e., the zip code associated with the destination of the article, to the mail recipient. In step G, the shipping rate associated with the article 22 is determined and shipping cost data 42 is returned to the mobile device 14.

In the described embodiment, a step H may be included to minimize the cost of shipping the article 22 to its destination address. That is, in a Step H1, the on-line mail processing system 10 may include program code to compare rate data 50, i.e., the delivery cost, of one carrier to that of another carrier. In the context used herein, the term "carrier" is used synonymously with the term "delivery agent" and may be used interchangeably therewith. Alternatively, in a step H2, the delivery of the article 22 may be broadcast/announced to several delivery agents/carriers such that a competitive bid 52 may be obtained from multiple carriers C1, C2.

In step I, postage is purchased by inputting data associated with a virtual check, transfer of funds, credit or debit card account. That is, an operator inputs the necessary funding account information, i.e., the purchase/authentication data 60 such as the credit card account holder, number and Personal Identification Number (PIN) via the mobile device 14. Once the postage label information is returned to the mobile device 14, in Step J, the print data 70 is spooled to a meter/printer 72. Additionally, the print data 70 may be electronically transmitted (e-mailed) for immediate or subsequent use at remote location.

In step K, the location of the nearest carrier is determined for delivery of the article or package. That is, an on line web service, i.e., direction/location finder 80 such as Google Maps, MapInfo, etc., may be used to locate the nearest carrier facility, e.g., FedEx drop-off location. Global Positioning System (GPS) data 82 may be provided to the direction/location finder, to find the nearest carrier facility. That is, since the mobile device 14 has integrated therein global positioning capability, the direction/location finder 80 can determine the location of the mobile device 14. Hence, the global positioning coordinates, e.g., latitude and longitude, of the mobile device 14 can be used determine which carrier facility is nearest. The mobile device 14 permits the operator to seamlessly navigate the web to find package drop locations for the selected carrier within a predetermined number of miles from the operator's current position.

In Step L, the on-line processing system 10 may also provide directions via a web service such as MapQuest. That is, the web service may transmit/return travel directions to the selected carrier/delivery agent.

In Step M, the package may be tracked while being delivered using various tracking means/devices within the carrier's distribution system. That is, tracking data 90 may be communicated to the mobile device 14 to inform the operator of the current location and progress of the package during its delivery. For example, push notifications may be provided to the operator with the package delivery status, i.e., when the package has arrived at predetermined checkpoints/waypoints during package transit. In another embodiment of the invention, the tracking data 90 may be linked with a calendar application within the mobile device 14 to log and record delivery events. That is, the tracking data 90 may be combined with the calendar to provide the operator with an estimate of when the article is scheduled to, be received, or arrive at the destination address. Furthermore, the tracking data 90 may be electronically transmitted to the mobile device to confirm that the article 22 was delivered and, indicate the date of delivery on the calendar.

Figure 3A:
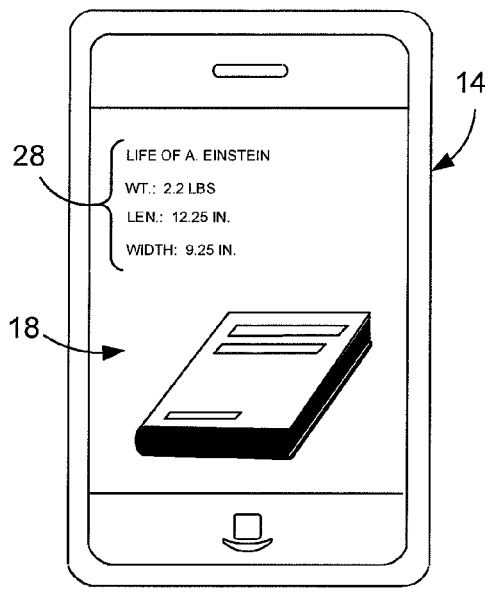
FIG. 3a depicts the information displayed on a touch-screen display of the wireless mobile device, i.e., a "screen-shot", illustrating an article for delivery identified by an image recognition system together with shipping data provided by a shipping information system.
Figure 3B:
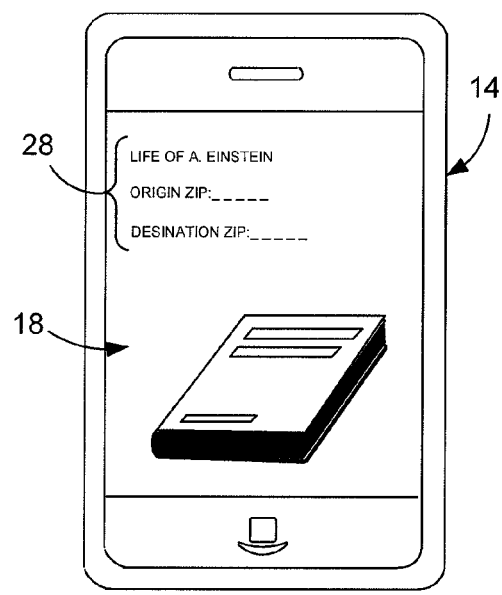
FIG. 3b depicts a screen-shot of the wireless mobile device display illustrating addition inputs which may be added to the shipping data of the shipping information system.

In FIGS. 3a through 3g, various "screen shots" of the mobile device 14 are shown to more fully describe the method steps discussed above. In FIG. 3a, shipping data 28 has been returned to the mobile device 14 and displayed on the touch screen display 18 thereof. This data 28 has been provided by a combination of the image recognition system 20 and the shipping information system 30 (see FIG. 1). In FIG. 3b, any missing data may be input via the touch screen display 18. For example, the address of origin and destination address may be input at this juncture in the shipping inquiry. This shipping data 28, and any additional information provided from other sources, may be stored in the shipping database 26 for future reference.

Figure 3C:
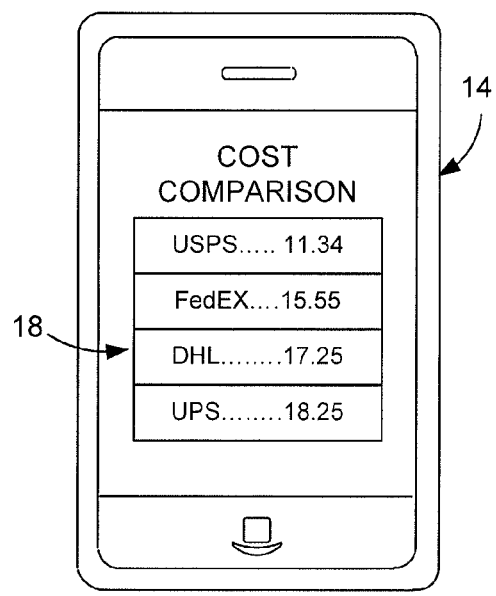
FIG. 3c depicts a screen-shot of the wireless mobile device display illustrating a comparison of the shipping costs associated with delivery of the imaged article.

In FIG. 3c, cost comparison data is transmitted and displayed on the screen 18 of the mobile device 14. The shipping cost data 42 associated with four (4) carriers is shown. Similar to the shipping data 28, this information may also be stored in the shipping database for future reference. As more information is collected and stored, the shipping information system 30 becomes more relevant and valuable. Of course this information must remain current to remain valuable and provide utility to those accessing the information.

Figure 3D:
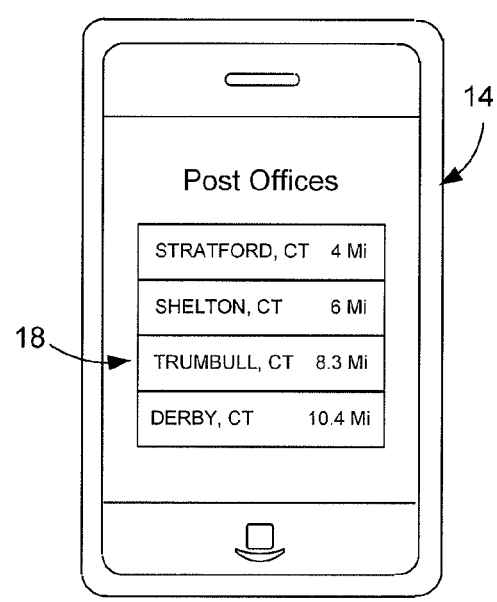
FIG. 3d depicts a screen-shot of the wireless mobile device display illustrating the nearest postal facilities for delivering the article including information relating to the distance between the operator and the nearest drop-off location.

In FIG. 3d, once a carrier has been selected, the wireless mobile display 18 provides the operator with information related to the nearest facilities which will accept and deliver the package. The mobile device 14 uses its positioning capability to provide coordinates to the satellite GPS to determine which facilities are nearest. In the illustrated embodiment, the relative location of various postal facilities is displayed.

Figure 3G:
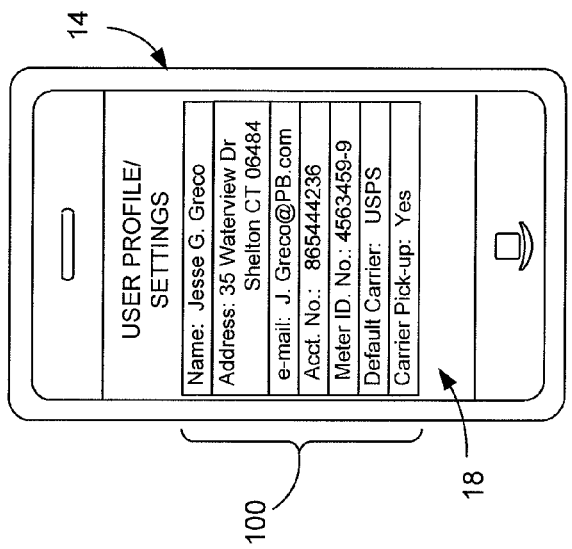
FIG. 3g depicts a screen-shot of the wireless mobile device display illustrating inputs which may be added by an operator as User Profile/Settings which will be used to control various functions of the on-line mail processing system.
Figure 3E:
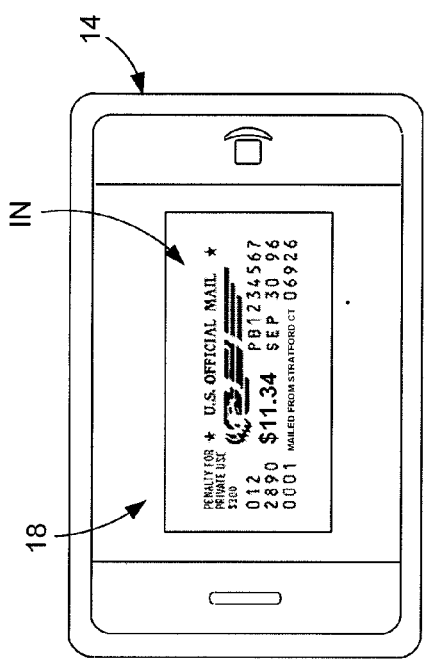
FIG. 3e depicts a screen-shot of the wireless mobile device display illustrating the purchased postage indicia which can then be produced on any convenient device connected to the printer network.

In FIG. 3e, the operator has selected the carrier and purchased postage necessary to deliver the article. Having selected the USPS to deliver the article, a standard USPS postage indicia IN is displayed on the screen 18 of the mobile device 14.

Figure 3F:
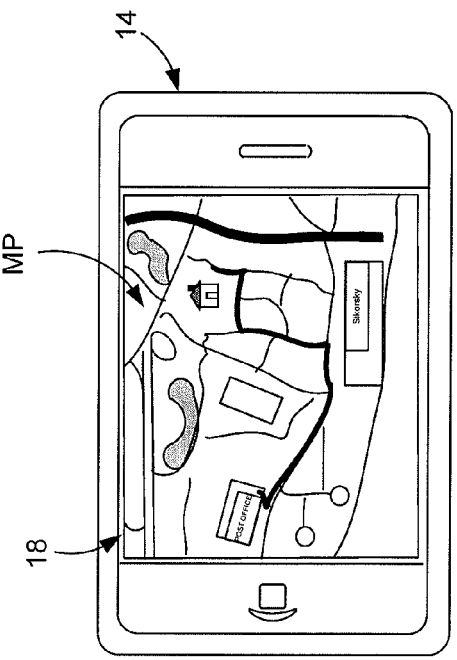
FIG. 3f depicts a screen-shot of the wireless mobile device display illustrating a map for directing an operator to the selected drop-off facility.

In FIG. 3F, a map MP provides direction to the selected postal facility The mobile device 14 uses its positioning capability to provide the coordinates necessary to produce the map MP displayed on the screen 18 of the mobile device 14.

In FIG. 3g, the operator is given the option to set or change various user profile/preferred settings 100 which will be used by the on-line mail processing system 10 to control various functions. These settings 100 may be displayed at any stage/phase of the shipping inquiry. For example, a customer Account No. AC may be input to purchase postage, i.e., the account to charge or debit funds, in step I of the inventive method. Furthermore, an operator's Meter ID No. MD may be input to provide accounting information when printing to a postage meter. That is, even though a postage meter debits an internal vault with each transaction, the mobile device 14 can transmit information, in step J of the method, regarding the operator for accounting purposes, i.e., charge-back to the user/user account. Moreover, input of these settings 100, may be useful to provide notification to a carrier, in step H2 of the method, that that pick-up rather than drop-off, is the preferred method of delivery, i.e., by indicating "Yes" in the Carrier Pick-up field CP. Accordingly, this input, transmitted in the RFQ by the mobile device 14, can be taken into consideration by the carrier when providing the rate quote for delivery.

In another embodiment of the invention, the imaging system 12 of the mobile device 14 may be used directly, or in addition to the image recognition system, to provide one or more shipping characteristics, i.e., as part of the shipping data 28. For example, inasmuch as the optics of the imaging system 12 can spatially locate the article, i.e., the optics can determine the proximity of the article 22 to the mobile device 14, the height, width and length dimensions of the article 22 can also be determined and returned to the mobile device 14 as one or, or in addition to, the shipping characteristics, i.e., as part of the shipping data 28, of the article 22. Additionally, this data can be used to update and populate the shipping database 32 with additional data.

In another embodiment of the invention, the global positioning coordinates, e.g., latitude and longitude, of the mobile device 14 can be used determine which printer is nearest, i.e., printer for printing postage, or most convenient relative to the current location of the mobile device 14 or the location of the selected carrier/carrier facility.

In summary, the present invention combines an image recognition system 20 with a shipping information system 30 to facilitate on-line mail processing of packages/parcels. The shipping data 28 may be updated and augmented by various on-line sources to maintain the relevancy of the shipping data provided to the operator. The on-line system also integrates the resources of other web services to facilitate the shipping process. For example, the mail processing system 10 integrates the ability to perform rate comparison, purchase postage on-line, produce a postage label, utilize GPS to locate convenient drop-off locations, provide directions to the nearest mail distribution center and track the progress of parcel delivery.

It is to be understood that the present invention is not to be considered as limited to the specific embodiments described above and shown in the accompanying drawings. For example, while the on-line processing system 10 illustrates several processors, i.e., a processor 20P for processing the acquired and stored image data, a processor 30P for processing and retrieving shipping data, the processor 14P contained internally of the mobile device 14 may be used to control and processor all functions of the on-line processing system 10, whether these functions be wireless or hard-wired, e.g., the camera of the mobile device 14. While the implementation is described as being incorporate on a 3G network The illustrations are merely illustrative of the best mode presently contemplated for carrying out the invention, and which are susceptible to changes as may be obvious to one skilled in the art. The invention is intended to cover all such variations, modifications and equivalents thereof as may be deemed to be within the scope of the claims appended hereto.

What is claimed is:

1. A method facilitating the delivery of an article, comprising the steps of:
    receiving an acquired digital image of the article over a communication network from a wireless mobile device having an optical imaging device;
    comparing the acquired digital image to a plurality of stored digital images, using a processor of an image recognition system, to determine the identity of the acquired digital image;
    determining, by a processor of a shipping information system, at least one characteristic of the identified image useful to determine a delivery cost associated with the identified image;
    calculating the cost of delivering the article to a destination address, using a processor, based upon the at least one characteristic;
    transmitting the delivery cost to the wireless mobile device, using a processor over a communication network;
    receiving, over the network from the wireless mobile device, a request to locate at least one of the nearest delivery agents for delivering the article;
    determining the location of the wireless mobile device based on the global positioning coordinates thereof using a global positioning system; and
    transmitting the location of at least one of the delivery agents within a predetermined distance from the wireless mobile device over the communication network.

2. The method according to claim 1 further comprising the steps of:
    receiving a request, over the communication network, to compare rate data associated with a plurality of delivery agents,
    comparing the rate data, using a processor, to determine a list of rate quotes; and
    and transmitting the rate quotes to the wireless mobile device, over the communication network, thereby allowing selection at the mobile device of the delivery cost.

3. The method according to claim 1 further comprising the step of:
    receiving a request, over the communication network, to determine a quote for delivering the article;
    determining the quote for delivering the article using a processor, and
    transmitting quote data, over the communication network, to the wireless mobile device.

4. The method according to claim 1 wherein evidence of payment of the delivery cost is postage, and further comprising the steps of:
    receiving a request, over the communication network, to purchase the postage associated with delivering the article;
    electronically purchasing the postage, using a processor, to deliver the article, and
    transmitting authentication data of the purchased postage to the wireless mobile, device.

5. The method according to claim 1 further comprising the steps of:
    inducting the article for delivery into a distribution system of a delivery agent;
    receiving a request, over the communication network to track the location of the article within the distribution system of the delivery agent;
    tracking the location of the article using a processor, and
    transmitting the location of the article over the communication network to the wireless mobile device.

6. The method according to claim 4 further comprising the step of:
    printing a postage indicia of the purchased postage on a printing device.

7. A system for facilitating the delivery of an article, comprising:
    a wireless mobile device having a display for receiving input information from, and presenting information to, an operator, an optical imaging device for acquiring digital image data of the article and transmitting the digital image data over a wireless network, the wireless mobile device, furthermore issuing a location signal indicative of the current global position coordinates of the wireless mobile device over the communication network;
    an image recognition system, responsive to digital image data, for comparing the acquired digital image to a plurality of stored digital images and for determining the identity of the acquired digital image;
    a shipping information system including a shipping database for determining at least one characteristic of the identified image useful to determine a delivery cost associated with the article;
    an on-line postage estimation system for determining the delivery cost, based on the at least one characteristic, to deliver the article from an address of origin to a destination address,
    a global positioning system, responsive to the location signal of the wireless mobile device, to determine the relative position of the wireless mobile device to a variety of delivery agents within a predetermined distance of the wireless mobile device; and
    a processor for controlling the functions of the wireless mobile device, determining the delivery cost, displaying the delivery cost to the operator on the display of the wireless mobile device and displaying the location of several candidate delivery agents on the display of the wireless mobile device.

8. The system according to claim 7 wherein the processor includes program code to compare the delivery cost of one delivery agent from the delivery cost of at least one other delivery agent, and displaying the delivery cost data associated with the delivery agents to the operator on the display of the wireless mobile device.

9. The system according to claim 7 wherein the processor of the wireless mobile device issues a request to a web service provider to provide a quote for delivering the article from the address of origin to the destination address, wherein the web service provider provides quotes from a plurality of delivery agents associated with delivering the article and transmits quote data indicative thereof to the wireless mobile device, and wherein the processor displays at least one of the quotes the quote data to the operator on the display of the wireless mobile device.

10. The system according to claim 7 wherein evidence for payment of the delivery cost is postage, wherein the processor of the wireless mobile device issues a request to a web service provider to purchase postage associated with delivering the article, wherein the web service provider transmits authentication data of the purchased postage to the wireless mobile device, and wherein the processor displays an authenticated postage indicia on the display of the wireless mobile device.

11. The system according to claim 10 further comprising one of a printer and a meter for printing the postage indicia.

12. The system according to claim 7 wherein the processor of the wireless mobile device issues a request to a web service provider to track the location of the article within the distribution system of the delivery agent, wherein the web service provider transmits the location of the article to the wireless mobile device, and wherein the processor displays the location of the article on the display of the wireless mobile device.

13. A method facilitating the delivery of an article, comprising the steps of:
    obtaining an acquired digital image of the article using a wireless mobile device having optical imaging device for capturing the acquired digital image;
    transmitting the acquired digital image, using a processor, over a wireless network to an image recognition system having a database of stored digital images, the image recognition system identifying the image by using a processor to compare the acquired digital image to the stored digital images;
    determining at least one characteristic of the identified image useful, using a processor of a shipping information system, to determine a delivery cost associated with the identified image;
    calculating the cost of delivering the article to a destination address using a processor; and
    transmitting a request over the communication network using the wireless mobile device to obtain the location of the nearest delivery agent for delivering the article, the request including the transmission of the global position coordinates of the mobile device;
    determining the location of several delivery agents within a predetermined distance from the wireless mobile device using a global positioning system;
    transmitting the delivery cost to the wireless mobile device, using a processor and
    displaying the delivery cost and the location of several delivery agents within a predetermined distance from the wireless mobile device on a display of the wireless mobile device.

14. The method according to claim 13 further comprising the steps of:
    comparing rate data, using a processor, for delivering the article from a plurality of delivery agents,
    comparing the rate data, using a processor, to determine a delivery cost associated with each of the delivery agents; and
    and transmitting the delivery costs, using a processor, to the wireless mobile device thereby allowing selection at the mobile device of the delivery cost.

15. The method according to claim 13 further comprising the steps of:
    requesting a shipping quote for delivering the article from a selected delivery agent over a communication network;
    receiving a shipping quote using a processor from a shipping database, and
    displaying the shipping quote on a display of the wireless mobile device.

16. The method according to claim 13 further comprising the steps of:
    requesting the purchase of postage associated with delivering the article over a communication network using the wireless mobile device; and
    displaying confirmation of the purchased postage on the display of the wireless mobile device using a processor; and
    printing a postage indicia of the purchased postage by a printing device.

17. The method according to claim 13 further comprising the steps of:
    inducting the article for delivery into a distribution system of a delivery agent;
    requesting data associated with the location of the article within the distribution system of the delivery agent;
    receiving the location data from a tracking system;
    displaying the location of the article on the display of the wireless mobile device.

18. The method according to claim 1 further comprising the steps of:
    receiving a request to locate a printer from one of a plurality of printers to print the postage indicia, each of the printers being spatially defined by a set of global positioning coordinates;
    selecting, based upon the global positioning coordinates of the printers and the wireless mobile device, at least one of the printers in close proximity to the wireless mobile device using the global positioning system; and
    transmitting the location of at least one of the nearest printers over the communication network to the mobile device.

19. The system according to claim 11 wherein the processor of the wireless mobile device issues a request to a web service provider to locate at least one of the nearest one of a printer and a meter for printing the postage indicia, wherein the web service provider transmits the location of at least one of the nearest one of the printer and the meter to the wireless mobile device using the global positioning coordinates thereof, and wherein the processor displays the location of at least one of the nearest one of the printer and the meter.

20. The method according to claim 16 further comprising the steps of:
    receiving a request to locate a printer from one of a plurality of printers to print the postage indicia, each of the printers being spatially defined by a set of global positioning coordinates;
    selecting, based upon the global positioning coordinates of the printers and the wireless mobile device, at least one of the printers in close proximity to the wireless mobile device using the global positioning system; and
    transmitting the location of at least one of the nearest printers over the communication network to the mobile device.

* * * * *